United States Patent
Nakano (10) Patent No.: US 10,354,854 B2
(45) Date of Patent: Jul. 16, 2019

(54) SHUTTER

(71) Applicant: SHIMADZU CORPORATION, Kyoto-shi, Kyoto (JP)

(72) Inventor: Tomohito Nakano, Kyoto (JP)

(73) Assignee: SHIMADZU CORPORATION, Kyoto-shi, Kyoto (JP)

(*) Notice: Subject to any disclaimer, the term of this patent is extended or adjusted under 35 U.S.C. 154(b) by 0 days.

(21) Appl. No.: 15/744,124

(22) PCT Filed: May 16, 2016

(86) PCT No.: PCT/JP2016/064507
§ 371 (c)(1),
(2) Date: Jan. 12, 2018

(87) PCT Pub. No.: WO2017/010163
PCT Pub. Date: Jan. 19, 2017

(65) Prior Publication Data
US 2018/0204713 A1  Jul. 19, 2018

(30) Foreign Application Priority Data
Jul. 13, 2015 (JP) ................. 2015-139315

(51) Int. Cl.
*H01J 49/04* (2006.01)
*H01J 49/24* (2006.01)
(Continued)

(52) U.S. Cl.
CPC ........ *H01J 49/0495* (2013.01); *F16K 3/0209* (2013.01); *F16K 3/029* (2013.01); *F16K 3/246* (2013.01); *H01J 49/24* (2013.01); *H01J 49/26* (2013.01)

(58) Field of Classification Search
None
See application file for complete search history.

(56) References Cited

U.S. PATENT DOCUMENTS

2004/0007666 A1* 1/2004 Griffey ............... H01J 49/0077
                                                              250/282
2005/0150559 A1* 7/2005 Kwon ....................... F16K 3/32
                                                              137/630.12
(Continued)

FOREIGN PATENT DOCUMENTS

CA       2 837 540 A1   12/2012
CN      204358139 U  *  5/2015  ............... F16K 3/02
(Continued)

OTHER PUBLICATIONS

International Search Report of PCT/JP2016/064507 dated Aug. 16, 2016.
(Continued)

*Primary Examiner* — Michael J Logie
(74) *Attorney, Agent, or Firm* — Sughrue Mion, PLLC (57) ABSTRACT

A shutter moves along a surface of a partition wall provided between two spaces different in pressure, which faces the space higher in pressure, to open and close an aperture formed on the partition wall with an amount of force smaller than conventional shutters require. The shutter includes: a plate-shaped first member arranged in a manner of moving along a surface of the partition wall, which faces one of the two spaces higher in pressure, to open and close the aperture, the first member being provided, in a region which corresponds to the aperture, with a small aperture having an area smaller than the area of the aperture, and a plate-shaped second member arranged in a manner of moving along a surface of the first member, which faces the space higher in pressure, to open and close the small aperture.

11 Claims, 5 Drawing Sheets

(51) Int. Cl.
*H01J 49/26* (2006.01)
*F16K 3/02* (2006.01)
*F16K 3/24* (2006.01)

(56) References Cited

U.S. PATENT DOCUMENTS

| | | | |
|---|---|---|---|
| 2009/0206249 A1 | 8/2009 | Howard | |
| 2009/0218486 A1* | 9/2009 | Whitehouse | H01J 49/063 250/288 |
| 2012/0227830 A1* | 9/2012 | Eto | H01L 21/67253 137/67 |
| 2014/0217279 A1* | 8/2014 | Kenny | H01J 49/067 250/283 |

FOREIGN PATENT DOCUMENTS

| | | | |
|---|---|---|---|
| DE | 19954644 A1 * | 6/2001 | F16K 3/182 |
| DE | 19954644 A1 | 6/2001 | |
| EP | 2 248 146 A1 | 11/2010 | |
| EP | 2 715 773 A2 | 4/2014 | |
| GB | 2491484 A | 12/2012 | |
| JP | 10-325827 A | 12/1998 | |
| JP | 2011-512639 A | 4/2011 | |
| JP | 2014-107012 A | 6/2014 | |
| JP | 2014-517475 A | 7/2014 | |
| KR | 10-2005-0073827 A | 7/2005 | |
| WO | 2009/105389 A1 | 8/2009 | |
| WO | 2012/164309 A2 | 12/2012 | |

OTHER PUBLICATIONS

Written Opinion dated Aug. 16, 2016 in application No. PCT/JP2016/064507.
Communication dated Dec. 19, 2018 from the State Intellectual Property Office of the P.R.C. in application No. 201680041038.0.

* cited by examiner

SHUTTER

CROSS REFERENCE TO RELATED APPLICATIONS

This application is a National Stage of International Application No. PCT/JP2016/064507 filed May 16, 2016, claiming priority based on Japanese Patent Application No. 2015-139315 filed Jul. 13, 2015, the contents of all of which are incorporated herein by reference in their entirety.

TECHNICAL FIELD

The present invention relates to a shutter for use in opening and closing an aperture formed on a partition wall provided between two spaces different in pressure. In particular, the present invention relates to a shutter that can be preferably used in opening and closing the aperture in an ion introduction section of a mass spectrometer including an atmospheric pressure ionization source.

BACKGROUND ART

Sources for ionization which are used in a mass spectrometer have roughly two types: ionization sources that ionize a sample the atmospheric pressure (atmospheric pressure ionization sources), and ionization sources that ionize a sample under vacuum. The atmospheric pressure ionization source eliminates the labor required for evacuating an ionization chamber to vacuum, and is thus easy to operate. Accordingly, the atmospheric pressure ionization source has been used widely.

Figure 1:
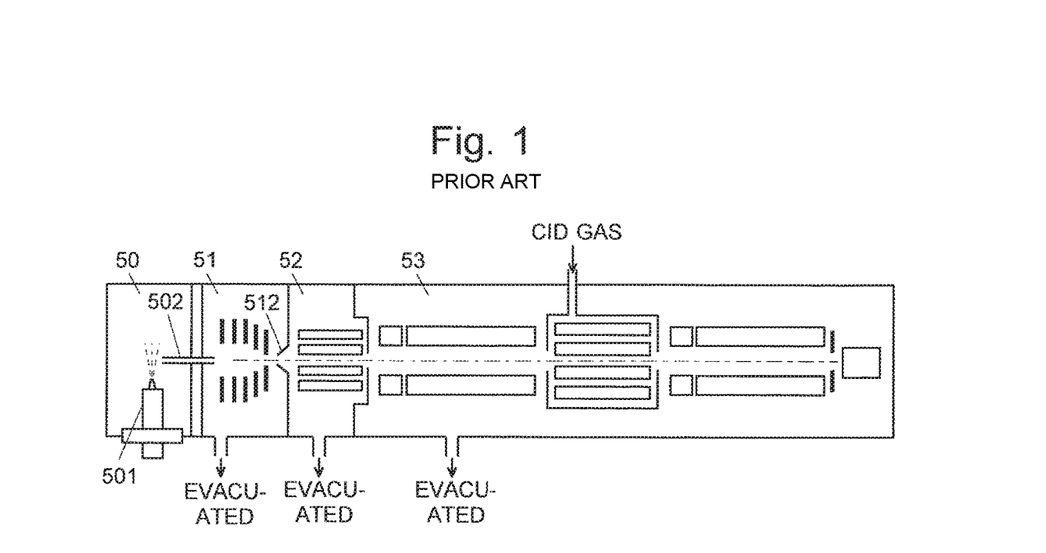
FIG. 1 is a schematic configuration diagram showing a conventional mass spectrometer.

FIG. 1 is a schematic configuration diagram showing a mass spectrometer that includes an electrospray ionization (ESI) source that is one of the atmospheric pressure ionization sources. The mass spectrometer has the configuration of a multi-stage differential pumping system including an ionization chamber 50 maintained at atmospheric pressure and an analysis chamber 53 evacuated to a high degree of vacuum, between which first and second intermediate vacuum chambers 51 and 52 are provided having their degrees of vacuum increased in a stepwise manner. The ionization chamber 50 communicates with the first intermediate chamber 51 via a thin heated capillary 502. The first intermediate vacuum camber 51 is separated from the second intermediate chamber 52 by a skimmer 512 having a small hole at its apex. The first and second intermediate chambers 51 and 52 are evacuated by a rotary pump, so as to be maintained at a low degree of vacuum. The analysis chamber 53 is evacuated by a turbo molecular pump, so as to be maintained at a high degree of vacuum.

If the inside of the mass spectrometer is opened to an atmospheric pressure condition, it takes time to thereafter evacuate the analysis chamber 53 to a high degree of vacuum. Accordingly, when a plurality of samples are sequentially subjected to mass spectrometry, the inside of a mass spectrometer is usually maintained at vacuum even during a standby status after the completion of mass spectrometry on one sample until the initiation of mass spectrometry on a next sample.

As just described, the ionization chamber 50, the first and second intermediate vacuum chambers 51 and 52, and the analysis chamber 53 communicate with one another. This causes air to continuously flow from the ionization chamber 50 at the atmospheric pressure into the analysis chamber 53 even during the standby status. Accordingly, the vacuum pumps, i.e. the rotary pump and the turbo molecular pump, need to operate even during the standby status to maintain the first and second intermediate vacuum chambers 51 and 52 and the analysis chamber 53 at vacuum, which applies an amount of load on these pumps. Furthermore, when the heated capillary 502 that is contaminated by foreign substances is removed from the mass spectrometer for replacement, for example, the quantity of the air flowing from the ionization chamber 50 to each of the chambers subsequent to the first intermediate vacuum chamber 51 increases, which disenables each of the chambers to be maintained at vacuum. With this condition, the vacuum pumps should be stopped. In other words, the inside of the mass spectrometer is opened to the atmospheric pressure condition every time the heated capillary 502 is replaced. This causes downtime for subsequent evacuation of the analysis chamber 53 to a high degree of vacuum.

In order to solve the above problems, a shutter mechanism may be provided for disconnecting the first and second intermediate vacuum chambers 51 and 52 and the analysis chamber 53 from the ionization chamber 50. For example, a partition wall having an aperture is provided inside the first intermediate vacuum chamber 51. A shutter for opening and closing the aperture and an actuator for moving the shutter are also provided in a side close to the ionization chamber 50. With such a shutter mechanism, the aperture can be closed by the shutter and reduce the amount of load on the vacuum pump during the standby status. In addition, the heated capillary 502 can be replaced with the degree of vacuum inside the analysis chamber 53 being maintained.

CITATION LIST

Patent Literature

Patent Literature 1: JP-A-10-325827
Patent Literature 2: JP-A-2014-107012

SUMMARY OF INVENTION

Technical Problem

In a shutter mechanism provided in a previously described manner, the shutter that disconnects the space at atmospheric pressure and the space evacuated to vacuum during the standby status is pushed toward the vacuum space by an amount of force according to the area of the aperture and the pressure difference between the two spaces. The shutter should be moved from this state for analyzing a sample. This requires the shutter to be moved with an amount of force against the friction generated between the shutter and the partition wall. The present inventor has measured the amount of force required to move the shutter that closes an aperture with φ40 mm, and found as much as approximately 13 kgf of force was needed to move the shutter. This means that a high-power actuator is needed for moving a shutter in the before-mentioned mechanism. High-power actuators are typically large in size and high in price. The shutter mechanism with such an actuator unfortunately causes the ion introduction section of a mass spectrometer to also be large in size and high in price. Even if the shutter is manually opened without using such an actuator, a great amount of force is needed.

In this case, the mass spectrometer is exemplified. Here, the problem the same as with the before-mentioned may be caused in various apparatuses that have the configuration in which an aperture formed on a partition wall provided between two spaces different in pressure is opened and closed by a shutter arranged in a manner of moving along a surface of the partition wall which is in the space higher in pressure (a surface that faces the space higher in pressure).

The problem to be solved by the present invention is to provide a shutter that moves along a high-pressure-side surface of a partition wall provided between two spaces different in pressure, to open and close an aperture formed on the partition wall, with an amount of force smaller than that conventional shutters require.

Solution to Problem

The present invention developed for solving the previously-mentioned problems relates to a shutter for use in opening and closing an aperture in a partition wall provided between two spaces different in pressure, the shutter including:

a) a plate-shaped first member arranged in a manner of moving along a surface of the partition wall, which faces one of the two spaces higher in pressure, to open and close the aperture, the first member being provided, in a region which corresponds to the aperture, with a small aperture having an area smaller than the area of the aperture, and b) a plate-shaped second member arranged in a manner of moving along a surface of the first member which faces the space higher in pressure, to open and close the small aperture.

The shutter according to the present invention includes the first member provided with the small aperture, and the second member that opens and closes the small aperture. The shutter is arranged in a manner of moving along the high-pressure-side surface of the partition wall (the surface which faces the space higher in pressure). In the mechanism using the shutter, the operation of shifting the state of the aperture from the state where the aperture in the partition wall is completely closed (full-closed state) to the state where the aperture is completely opened (full-open state) is performed as follows.

In the full-closed state, the aperture is closed by the first member, and the small aperture of the first member is closed by the second member. From this state, the second member is first allowed to slide, thereby opening the small aperture of the first member (intermediately-opened state). Then, the first member is allowed to slide from the intermediately-opened state, thereby opening the aperture in the partition wall. With this, the state of the aperture shifts from the intermediately-opened state to the full-open state.

In the full-closed state, the first member is pushed against the partition wall by the amount of force according to the area of the aperture in the partition wall and the difference in pressure between the two spaces. The second member is pushed against the first member by the amount of force according to the area of the small aperture of the first member and the difference in pressure between the two spaces. The area of the small aperture is smaller than that of the aperture of the partition wall, thereby allowing the second member to slide with the amount of force smaller than that for allowing the first member to slide. In the intermediately-opened state, the small aperture of the first member is opened. Accordingly, the two spaces communicate with each other via the small aperture, leveling the pressures of the two spaces over time. As a result, the first member can also be slid with a small amount of force to open the aperture of the partition wall (full-open state) with a lapse of predetermined time after the aperture is shifted to the intermediately-opened state.

Advantageous Effects of the Invention

A shutter according to the present invention is disposed in a surface of a partition wall provided between two spaces different in pressure which faces the space higher in pressure, to open and close an aperture formed on the partition wall. With this, the aperture can be opened with a relatively small amount of force.

DESCRIPTION OF EMBODIMENTS

A specific embodiment of a shutter according to the present invention is described as follows, with reference to the drawings.

Figure 2A:
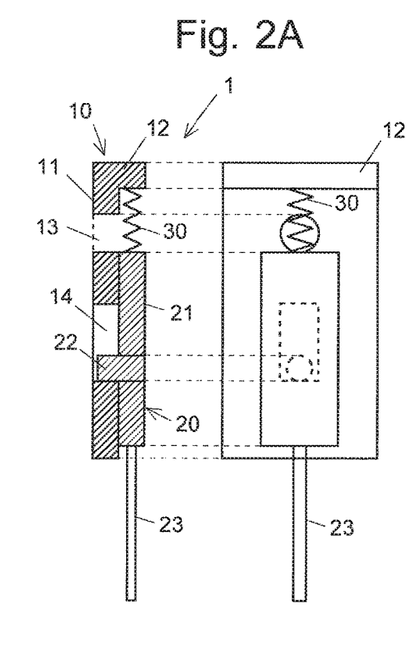
FIGS. 2A and 2B are configuration diagrams showing the main parts of a shutter according to an embodiment of the present invention.
Figure 2B:
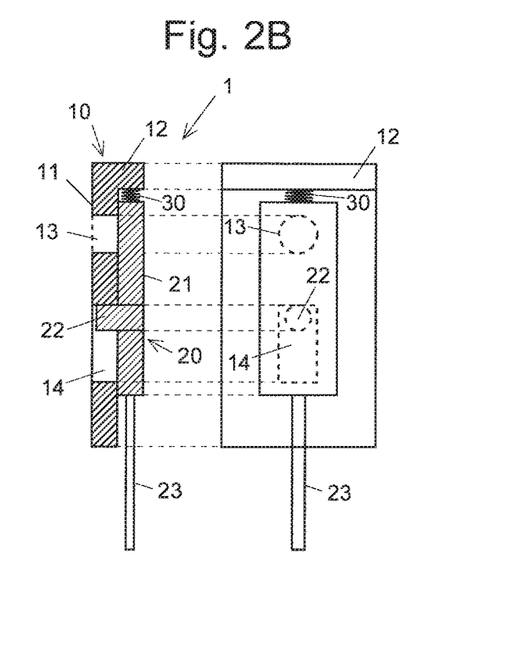

FIGS. 2A and 2B show the main parts of a shutter 1 according to the present embodiment. The shutter 1 of the present embodiment includes a first member 10, a second member 20, and a spring (urging member) 30 that connects the first member 10 and the second member 20. The first member 10 includes a plate-shaped main body 11 that is provided with an extending section 12, a small aperture 13, and a long hole 14. The second member 20 includes a plate-shaped main body 21 and a bar-shaped operation member 23 attached to one end of the main body 21. The main body 21 is provided with a convex portion 22. The first member 10 and the second member 20 are combined in such a manner that the extending section 12 and the opening of the long hole 14 face the second member 20, and the convex portion 22 of the second member 20 is inserted in the long hole 14. For the spring 30, springs having such a spring constant that the springs are compressed by an application of force greater than the self-weight of the first member 10 are applied. In other words, when no external force is applied to the shutter 1, the shutter 1 stays in a state shown in FIG. 2A. Although it is not a necessary requirement for the present invention to use the spring 30 having such a spring constant, the use of the spring 30 that meets the requirement is preferable for utilizing the restoring force of the spring in the operations of opening the small aperture 13. The operations will be described later.

FIG. 2A shows a condition that the convex portion 22 of the second member 20 is positioned at the bottom end of the long hole 14 of the first member 10. The operation member 23 is shifted downward from this state, allowing the first member 10 and the second member 20 to integrally move downward. The convex portion 22 is in contact with the bottom end of the long hole 14, so that the movement of the second member 20 is transferred to the first member 10.

The operation member 23 is shifted upward from the state shown in FIG. 2A. In this situation, when the top portion of the shutter 1 is opened (i.e., the top surface of the extending section 12 of the first member 10 is not in contact with any other member), the spring 30 is not compressed by the self-weight of the first member 10 while slightly compressed by the inertia of the first member 10. Accordingly, when the operation member 23 is stopped, the entirety of the shutter 1 is moved upward with the state shown in FIG. 2A. When the operation member 23 is shifted upward with the extending section 12 being in contact with, at the top surface thereof, another member, the first member 10 cannot move and the spring 30 is compressed, causing only the second member 20 to move upward. With this, the state of the shutter is shifted to the one shown in FIG. 2B. In FIG. 2B, the second member 20 causes the first member 10 to move upward by (i) pushing the extending section 12 of the first member 10 by the top portion of the main body 21 of the second member 20, and (ii) pushing upward the upper end of the long hole 14 of the first member 10 by the convex portion 22 of the second member 20. The first member 10 may be moved by only one of the aforementioned ways (i) and (ii). In this example, the long hole 14 is provided in the first member 10, while the convex portion 22 is provided in the second member 20. These can be arranged in the other one of the first and second members 10 and 20. Any configuration can be adopted which restricts the distance of the relative movement of the two members, in place of the combination of the convex and concave portions.

Figure 3:
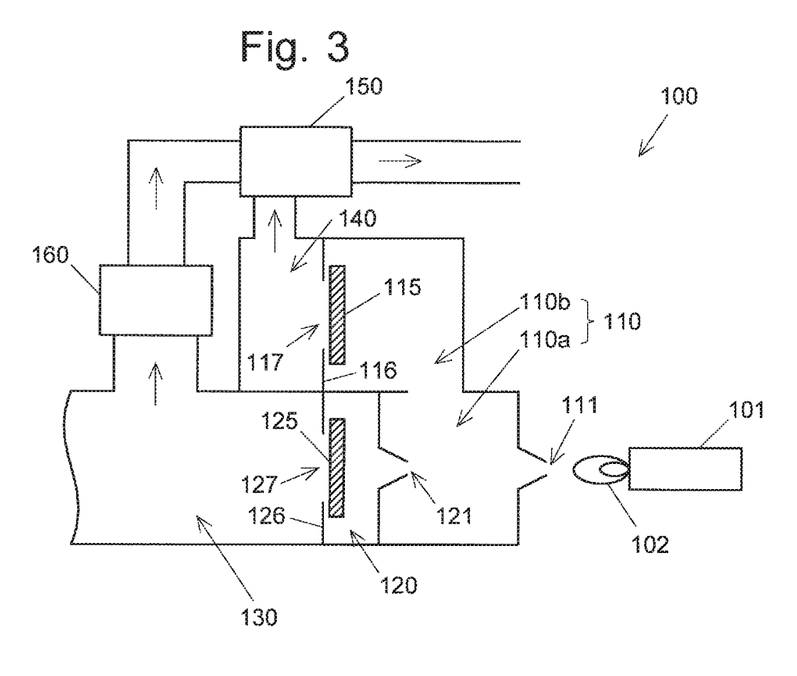
FIG. 3 is a configuration diagram showing the main parts of an ion introduction section in a mass spectrometer including the shutter according to the present embodiment.

FIG. 3 shows a schematic configuration of an ion introduction section in a mass spectrometer including the shutter with the aforementioned configuration. This mass spectrometer is a mass spectrometer (ICP-MS) 100 provided with a plasma ionization source that is one of the atmospheric pressure ionization sources. In the ICP-MS 100, while plasma 102 is generated at the distal end of a plasma torch 101, an atomized liquid sample is supplied to the distal end, so that ions are generated (Patent Literatures 1 and 2). The generated ions enter a main chamber 110a of a first vacuum chamber 110 in an analysis-chamber area through a first opening 111 formed at the apex of a skimmer. The first vacuum chamber 110 includes: the main chamber 110a that communicates with an analysis chamber 130 through a second vacuum chamber 120; and an auxiliary chamber 110b that connects to a rotary pump 150 through an intermediate chamber 140. The rotary pump 150 maintains the first vacuum chamber 110 at a low degree of vacuum. The ions that have entered the main chamber 110a of the first vacuum chamber 110 pass through a second opening 121 formed at the apex of another skimmer, and further enters the analysis chamber 130 so as to be analyzed. The analysis chamber 130 is evacuated by a turbo molecular pump 160 to be maintained at a high degree of vacuum.

The auxiliary chamber 110b of the first vacuum chamber 110 is separated from the intermediate chamber 140 by a partition wall 116 that is provided with an aperture 117. A first shutter 115 is arranged for opening and closing the aperture 117. Similarly, the second vacuum chamber 120 is separated from the analysis chamber 130 by a partition wall 126 that is provided with an aperture 127. A second shutter 125 is arranged for opening and closing the aperture 127. Each of the first shutter 115 and the second shutter 125 has the aforementioned configuration.

The first shutter 115 and the second shutter 125 are both opened (full-open state) during an analysis of a sample. The second shutter 125 and the first shutter 115 are sequentially closed (full-closed state) after completion of the analysis, and are prepared for the next analysis. At this time, the auxiliary chamber 110b of the first vacuum chamber 110 is opened to atmospheric pressure. The mass spectrometer is thus completely closed, thereby reducing the amounts of load on the rotary pump 150 and the turbo molecular pump 160, and preventing substances in the air from entering the inside of the mass spectrometer to avoid contamination thereof. This state also allows the skimmers to be detached for replacement or cleaned when the vicinity of each of the openings of the skimmers, such as the first opening 111 and the second opening 121, has been contaminated by foreign substances. Upon initiation of a new analysis, the first shutter 115 is opened to evacuate the first vacuum chamber 110 and the second vacuum chamber 120 to a low degree of vacuum by the rotary pump 150. After the completion of the evacuation of these chambers, the second shutter 125 is opened to establish the full-open state.

Subsequently, the steps of opening the aperture 117 formed in the partition wall 116 by the first shutter 115 are described with reference to FIGS. 4A to 4C. It should be noted that the operations of opening the aperture 127 by the second shutter 125 are the same with those of opening the aperture 117.

Figure 4A:
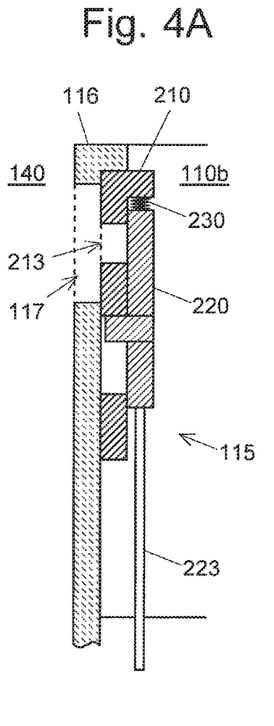
FIGS. 4A to 4C are diagrams showing the steps of closing an aperture by the shutter according to the present embodiment.

FIG. 4A shows a standby status after the completion of an analysis. The aperture 117 is completely closed (full-closed state). At this time, the aperture 117 is closed by a first member 210, and a small aperture 213 of the first member 210 is closed by a second member 220. In the standby status, the intermediate chamber 140 is maintained at a low degree of vacuum, and the auxiliary chamber 110b of the first vacuum chamber 110 is maintained at atmospheric pressure. Accordingly, the first shutter 115 is pushed against the partition wall 116 by an amount of force according to the area of the aperture 117 and the difference in pressure between the two chambers 140. More specifically, the first member 210 is pushed against the partition wall 116 by an amount of force according to the area of the aperture 117 and the difference in pressure between the two chambers, while the second member 220 is pushed against the first member 210 by an amount of force according to the area of the small aperture 213 of the first member 210 and the difference in pressure between the two chambers.

In the present embodiment, for opening the aperture 117, the operation member 223 of the second member 220 is first moved downward to move the second member 220 downward. The second member 220 is pushed against the first member 210 by the force mentioned earlier. Accordingly, an amount of force against friction between the second member 220 and the first member 210 is required for moving the second member 220. Here, the amount of force by which the second member 220 is pushed depends on the area of the small aperture 213 of the first member 210 (and the difference in pressure), and is smaller than the conventional amount of force that depends on the area of the aperture 117 of the partition wall 116 (and the difference in pressure). Thus, the second member 220 can be moved downward with an amount of force smaller than the conventionally required amount of force. In addition, the restoring force of a spring 230 also acts, so that the amount of force required for moving the operation member 223 is reduced even more.

Figure 4B:
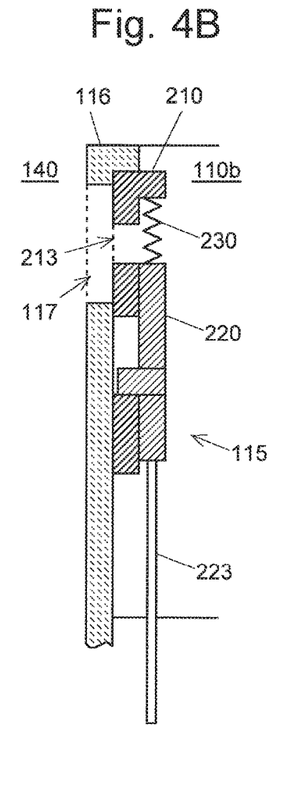
Figure 4C:
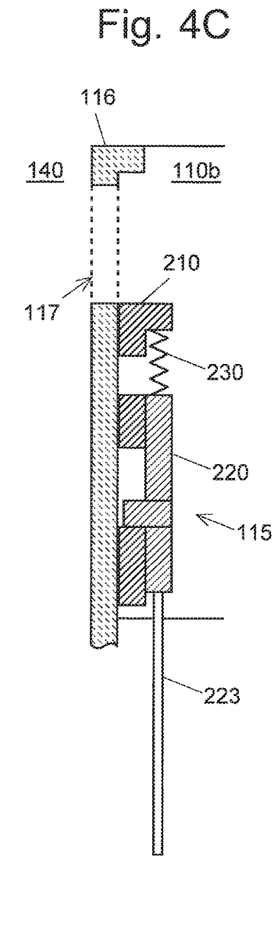

The second member 220 is moved downward, thereby allowing the intermediate chamber 140 and the auxiliary chamber 110b of the first vacuum chamber 110 to communicate with each other through the small aperture 213 of the first member 210 (intermediately-opened state), as shown in FIG. 4B. With this, the first vacuum chamber 110 including the main chamber 110a and the auxiliary chamber 110b is evacuated by the rotary pump 150, to a low degree of vacuum. After the completion of the evacuation of the first vacuum chamber 110 to a low degree of vacuum, the operation member 223 is further moved downward, to move the first member 210 and the second member 220 (i.e., the whole of the first shutter 115) downward, as shown in FIG. 4A, thereby completely opening the aperture 117 (full-open state). At this time, both the intermediate chamber 140 and the auxiliary chamber 110b of the first vacuum chamber 110 are brought to a state at the low degree of vacuum, so that there is no difference in pressure between these chambers. Accordingly, the first shutter 115 can be moved with a small amount of force to open the aperture 117.

After the aperture 117 is opened, the second shutter 125 is operated with the same steps as previously described, to thereby open the aperture 127 of the partition wall 126. Then, the mass spectrometer is ready for analysis. The steps for opening the aperture 117 are described in the present embodiment. The aperture 117 can be closed by following these steps in reverse order.

As aforementioned, with the shutter according to the present embodiment, shutters can be moved with an amount of force smaller than the conventionally required amount of force. This allows for the use of a small actuator, thereby providing a small and inexpensive device. In the ICP-MS 100, in particular, the temperature around the plasma torch 101 increases. Accordingly, the shutter should be disposed inside a chamber. This makes it particularly difficult to dispose a large driving source (actuator) for moving the shutter. Therefore, the shutter according to the present embodiment, which is movable with a small amount of force, can be preferably adopted.

Although the first shutter 115 and the second shutter 125 have the same configuration in the aforementioned embodiment, the second shutter 125 is not necessarily required to adopt the aforementioned configuration. The amount of force by which the second shutter 125 is pushed against the partition wall 126 upon opening the second shutter 125 depends on the area of the aperture 127 and the difference in pressure between the analysis chamber 130 and the second vacuum chamber 120. As described before, the first shutter 115 has already been opened when the second shutter 125 is opened. Thus, the first vacuum chamber 110 is brought to a state at a low degree of vacuum. The second vacuum chamber 120 that communicates with the first vacuum chamber 110 through the second opening 121 at the apex of the skimmer is also brought to a state at a low degree of vacuum. The difference in pressure between the analysis chamber 130 at a high degree of vacuum and the second vacuum chamber 120 at the low degree of vacuum is smaller than the difference in pressure between the low-degree vacuum state and the atmospheric pressure state. This allows the second shutter 125 to be moved without a large amount of force, even when the shutter has no aperture and is made of a single plate.

Although it has been described that each of the first shutter 115 and the second shutter 125 is moved with an independent driving source (or manually moved individually) in the before-mentioned embodiment, the first shutter 115 and the second shutter 125 can be operated with a single connection member. A shutter mechanism 300 having such a configuration is hereinafter described.

Figure 5:
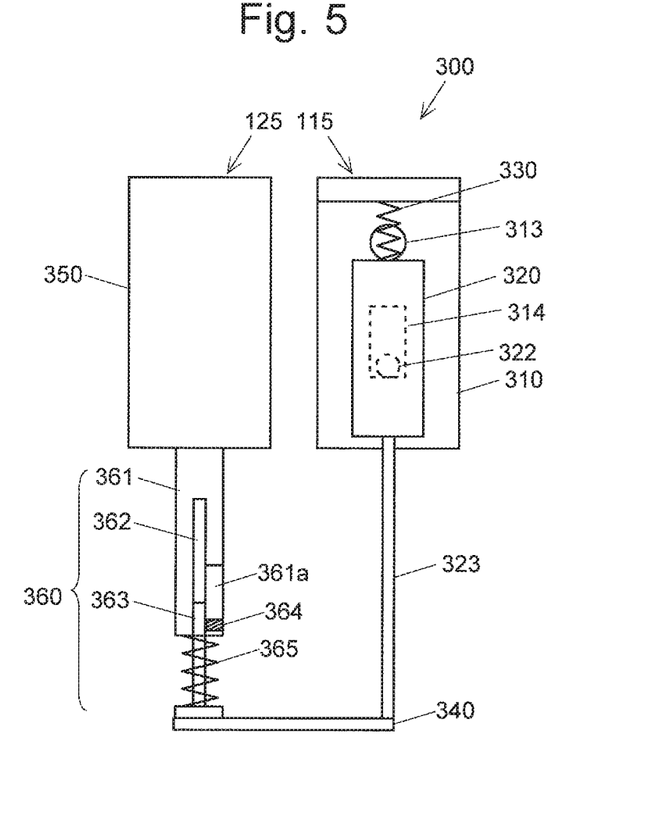
FIG. 5 is a configuration diagram showing the main parts of a shutter mechanism including the shutter according to the present embodiment.

As shown in FIG. 5, the shutter mechanism 300 includes a single connection member 340 that connects an operation member 323 of the first shutter 115 to the second shutter 125. The first shutter 115 has the similar configuration with those previously mentioned, and includes a first member 310 and a second member 320. The second shutter 125 includes a plate member 350 with no aperture, and an operation member 360. The operation member 360 includes: a main body 361 attached to the bottom end of the plate member 350; a hollow portion 362 provided in the main body 361; a column member 363 inserted in the hollow portion 362 (the main body 361 and the column member 363 provide an extendable member): a convex portion 364 provided on the column member 363; and a spring 365 surrounding the periphery of the column member 363 and having opposite ends individually connected to the bottom end of the main body 361 and the connection member 340. The main body 361 has a long hole 361a into which the convex portion 364 is inserted. For the spring 365, a spring is used which has a spring constant that the spring is compressed upon receiving an amount of force greater than the self-weight of the second shutter 125.

Figure 6A:
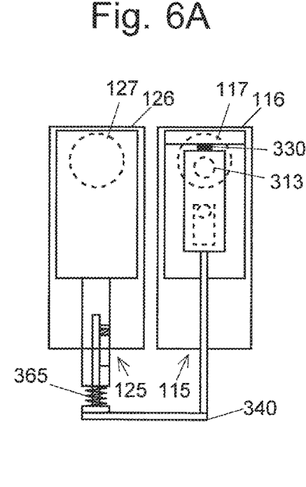
FIGS. 6A to 6C are diagrams showing the steps of closing an aperture by the shutter mechanism according to the present embodiment.

Subsequently, descriptions are given to steps of opening the aperture 117 in the partition wall 116 and the aperture 127 in the partition wall 126, in the shutter mechanism 300. FIG. 6A shows that the aperture 117 is closed by the first shutter 115 (the first member 310 and the second member 320), and the aperture 127 is closed by the second member 125 (the plate member 350). At this time, the convex portion 364 of the second shutter 125 is located at the upper end of the long hole 361a. The spring 330 of the first shutter 115 and the spring 365 of the second shutter 125 are both compressed.

Figure 6B:
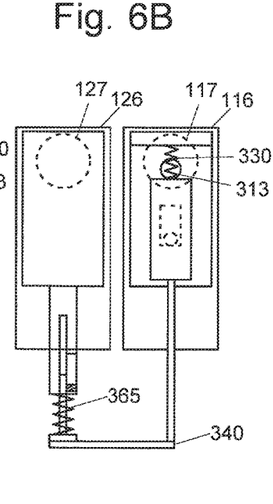

From this state, the connection member 340 is moved downward to move only the second member 320 of the first shutter 115 downward, thereby opening a small aperture 313 of the first member 310 (FIG. 6B). At this time, the convex portion 322 of the second member 320 in the first shutter 115 moves downward in the long hole 314 of the first member 310, and the convex portion 364 in the second shutter 125 moves downward in the long hole 361a. This operation requires an amount of force against friction between the second member 320 and the first member 310 in the first shutter 115. As described earlier, this amount of force is smaller than required in conventional shutters. In the configuration according to the present embodiment, the restoring force of the two springs 330 and 365 can be used, thereby allowing the second member 320 of the first shutter 115 to move with a much smaller amount of force.

Figure 6C:
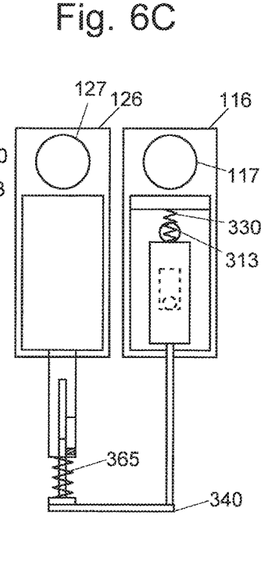

Subsequently, the intermediate chamber 140, the first vacuum chamber 110, and the second vacuum chamber 120 are evacuated to a low degree of vacuum by the rotary pump 150. Then, the connection member 340 is further drawn downward, to open both apertures 117 and 127 (FIG. 6C). This shutter mechanism 300 allows the two shutters 115 and 125 which respectively open and close the two apertures 117 and 127 to be moved with a single and small actuator. Although, movement of the second member 320 of the first shutter 115 requires the greatest amount of force in the series of operations, the restoring force of the two springs 330 and 365 acts at this time, thereby further reducing the driving force required for the actuator.

Description has so far been given to the shutter mechanism used for sequentially opening the two apertures 117 and 127. For simultaneous opening of the two apertures 117 and 127, the operation member 323 may be used in place of the operation member 360.

The aforementioned embodiment is an example of the present invention, and can be appropriately modified in line with the purposes of the present invention. Although the aperture and the small aperture have a circular shape in the aforementioned embodiment, they may have an elliptic shape or a polygonal shape. Furthermore, the shapes of the aperture and the small aperture are not necessarily identical to each other.

The shutter according to the present invention is featured by the first member having the small aperture with an area smaller than that of the aperture of the partition wall provided between two spaces different in pressure, and the second member that opens and closes the small aperture: other structural components can appropriately be changed. The shutter is used by being attached to the partition wall provided between two spaces different in pressure. Therefore, it may naturally include members necessary for keeping airtightness at appropriate positions.

Figure 7A:
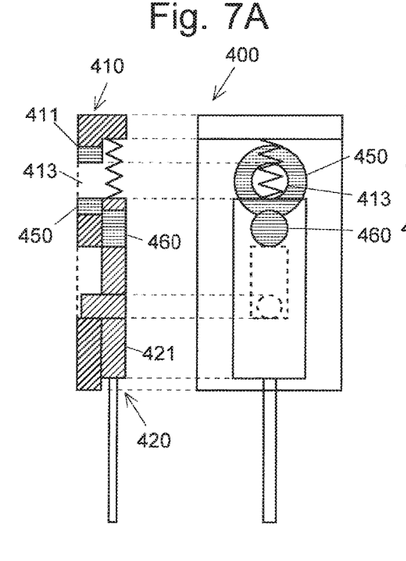
FIGS. 7A and 7B are configuration diagrams showing the main parts of a shutter according to a modified embodiment of the present invention.
Figure 7B:
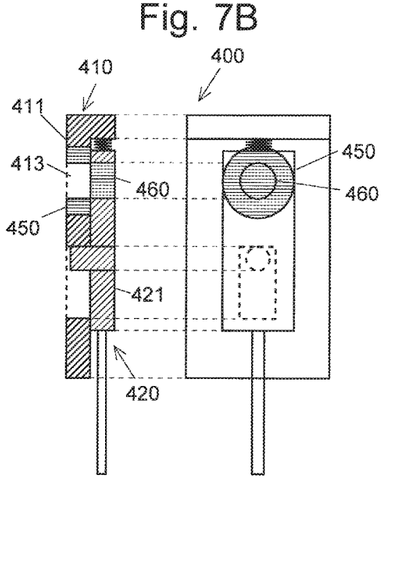

Displacement may occur in a contact surface between the partition wall and the first member, or between the first member and the second member (for example, one of the plate surfaces may be inclined with respect to the other one, or a warp may occur in one of the plates). Even in such a case, the airtightness can be secured by adopting the configuration shown in FIGS. 7A and 7B. FIG. 7A shows a state where a small aperture 413 is opened. FIG. 7B shows a state where the small aperture 413 is closed. The shutter 400 shown in FIGS. 7A and 7B includes a doughnut-shaped plug 450 (the small aperture 413 is provided at the center thereof) in the main body 411 of the first member 410 at a position corresponding to the periphery of the closed aperture 117, and a disc-shaped plug 460 in the main body 421 of the second member 420 at a position corresponding to the periphery of the closed small aperture 413. In the shutter 400, the plugs 450 and 460 are drawn toward the side lower in pressure (the side of the intermediate chamber 140), so as to close the aperture 117 (or the small aperture 413). Accordingly, if a slight degree of displacement occurs in the contact surface between the partition wall and the first member, or the contact surface between the first member and the second member, the airtightness can be maintained. These plugs 450 and 460 only need to have elastic members at the respective parts corresponding to the circumference of the aperture and the circumference of the small aperture; other parts may be made of non-elastic members. For example, the plug 460 may have such a configuration that an elastic member surrounds the periphery of a disc-shaped non-elastic member. Although FIGS. 7A and 7B show an example in which the plugs 450 and 460 are respectively provided in the first member 410 and the second member 420, the plug may be attached to only one of these two members, depending on the necessity. For example, the plug 460 may be attached only to the second member 420 so that the small aperture 413 of the first member 410 can be surely closed when the full-closed state is established.

Although an example in which the shutter of the present invention is adopted in the ICP-MS 100 has been described, the shutter of the present invention can also be used in a mass spectrometer provided with a different type of atmospheric pressure ionization source (a mass spectrometer shown in FIG. 1, for example), in a similar manner. Furthermore, the shutter or the shutter mechanism according to the present invention can also be used in various apparatuses that have a configuration of opening and closing an aperture in a partition wall provided between two spaces different in pressure, in addition to an analysis apparatus, such as a mass spectrometer.

REFERENCE SIGNS LIST

1, 400 . . . Shutter
10, 210, 310, 410 . . . First Member
11 . . . Main Body (of First Member)
12 . . . Extending Section
13, 213, 313, 413 . . . Small Aperture
14, 314 . . . Long Hole (of First Member)
20, 220, 320, 420 . . . Second Member
21 . . . Main Body (of Second Member)
22, 322 . . . Convex Portion
23, 223, 323, 423 . . . Operation Member
30, 230, 330 . . . Spring
300 . . . Shutter Mechanism
340 . . . Connection Member
350 . . . Plate Member
360 . . . Operation Member
361 . . . Main Body (of Operation Member)
361a . . . Long Hole (of Operation Member)
362 . . . Hollow Portion
363 . . . Column Member
364 . . . Convex Portion (of Column Member)
365 . . . Spring (of Operation Member)
450, 460 . . . Plug
100 . . . Mass Spectrometer
101 . . . Plasma Torch
102 . . . Plasma
110 . . . First Vacuum Chamber
110a . . . Main Chamber
110b . . . Auxiliary Chamber
115 . . . First Shutter
116, 126 . . . Partition Wall
117, 127 . . . Aperture
120 . . . Second Vacuum Chamber
125 . . . Second Shutter
130 . . . Analysis Chamber
140 . . . Intermediate Chamber
150 . . . Rotary Pump
160 . . . Turbo Molecular Pump

The invention claimed is:

1. A shutter for use in opening and closing an aperture in a partition wall provided between two spaces different in pressure, the shutter comprising:
    a first member arranged in a manner of moving along a surface of the partition wall, which faces one of the two spaces higher in pressure, the first member being provided, at a position which corresponds to the aperture, with a small aperture having an area smaller than an area of the aperture;
    a second member arranged in a manner of moving along a surface of the first member, which faces the space higher in pressure
    a bar attached to the second member;
    an actuator capable of applying a force to the bar such that the bar moves; and
    wherein the bar is configured to move the first member and the second member such that the shutter shifts between a full-open state and a full-closed state, the first member being moved by the bar via the second member,
    wherein the shutter passes through an intermediately-opened state with the aperture partially closed and the small aperture opened when the shutter is shifted from the full-open state with the aperture opened to the full-closed state with the aperture and the small aperture both closed, as well as from the full-closed state to the full-open state, wherein the aperture is covered by the first member and the second member in the full-closed state, and wherein the small aperture is covered by the second member in the full-closed state.

2. The shutter according to claim 1, further comprising:
a spring connecting the first member and the second member, the spring urging the second member in a direction for opening the small aperture.

3. The shutter according to claim 1, wherein:
a long hole extending in the moving direction of the second member is formed in one of the first member and the second member, while a convex portion inserted into the long hole is formed in another one of the first member and the second member;

the convex portion is in contact with one end of the long hole in a state that the small aperture is closed by the second member, while the convex portion is in contact with another end of the long hole in a state that the small aperture is opened by the second member; and the bar closes the aperture by moving the first member by moving the second member in a direction for closing the small aperture beyond a position where the convex portion is in contact with the one end of the long hole, and the bar opens the aperture by moving the first member by moving the second member in a direction for opening the small aperture beyond a position where that the convex portion is in contact with the other end of the long hole.

4. The shutter according to claim 1, further comprising:
a plug having a portion composed of an elastic material at a position corresponding to an outer periphery of the aperture in a state that the aperture is closed by the first member.

5. A shutter mechanism comprising:
two shutters including at least a shutter that is the shutter according to claim 1,
wherein:
each of the two shutters includes a bar to be operated for moving the shutter; and
the bar of each of the two shutters has one end connected to a connection member commonly used by the two shutters.

6. The shutter mechanism according to claim 5, wherein the bar of one of the two shutters includes an extendable member extendable in a direction along which the shutter moves, and a restriction member that restricts extension of the extendable member to a predetermined distance.

7. A mass spectrometer comprising the shutter mechanism according to claim 5.

8. The mass spectrometer according to claim 7, comprising a plasma ionization source to be used under a condition of atmospheric pressure.

9. A mass spectrometer comprising the shutter according to claim 1.

10. The mass spectrometer according to claim 9, comprising a plasma ionization source to be used under a condition of atmospheric pressure.

11. The shutter according to claim 1, further comprising a plug having a portion composed of an elastic material at a position corresponding to an outer periphery of the small aperture in a state that the small aperture is closed by the second member.

* * * * *